United States Patent
Andersson

(10) Patent No.: US 11,493,766 B2
(45) Date of Patent: Nov. 8, 2022

(54) METHOD AND SYSTEM FOR CONTROLLING TRANSPARENCY OF A DISPLAYING DEVICE

(71) Applicant: Tobii AB, Danderyd (SE)

(72) Inventor: Henrik Andersson, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/125,080

(22) Filed: Dec. 17, 2020

(65) Prior Publication Data

US 2021/0208403 A1 Jul. 8, 2021

(30) Foreign Application Priority Data

Dec. 17, 2019 (SE) .................................. 1951484-3

(51) Int. Cl.
*G02B 27/01* (2006.01)
*G06F 3/01* (2006.01)
*G02B 27/00* (2006.01)

(52) U.S. Cl.
CPC ..... *G02B 27/0172* (2013.01); *G02B 27/0075* (2013.01); *G02B 27/0093* (2013.01); *G06F 3/013* (2013.01); *G02B 2027/0138* (2013.01); *G02B 2027/0185* (2013.01)

(58) Field of Classification Search
CPC ............ G02B 27/0075; G02B 27/0093; G02B 27/0172; G02B 2027/0138; G02B 2027/0185; G06F 3/013
See application file for complete search history.

(56) References Cited

U.S. PATENT DOCUMENTS

| | | | | |
|---|---|---|---|---|
| 10,032,312 | B2* | 7/2018 | Bean | G02B 27/01 |
| 11,061,240 | B2* | 7/2021 | Godar | G06T 15/04 |
| 2016/0085301 | A1 | 3/2016 | Lopez | |
| 2017/0358141 | A1* | 12/2017 | Stafford | A63F 13/537 |
| 2020/0174298 | A1* | 6/2020 | Davis | G02F 1/13318 |
| 2021/0141076 | A1* | 5/2021 | Ilic | G02B 27/0093 |
| 2021/0165484 | A1* | 6/2021 | Suguhara | G06F 3/011 |

OTHER PUBLICATIONS

Swedish Search Report and Written Opinion of Swedish Patent App. No 1951484-3, dated Sep. 28, 2020.

* cited by examiner

*Primary Examiner* — Nelson M Rosario
(74) *Attorney, Agent, or Firm* — Kilpatrick Townsend & Stockton LLP

(57) ABSTRACT

A method for controlling the transparency level of a transparent displaying device arranged to display one or more virtual objects, the method comprising the steps of: obtaining a gaze point of a user; obtaining a position of at least one virtual object displayed by the displaying device; determining whether the attention of the user is directed to the virtual object based on the obtained gaze point; and if so, adjusting a transparency level of the displaying device. A system operative for controlling the transparency level in a displaying device, as well as a displaying device comprising such a system is also disclosed.

16 Claims, 5 Drawing Sheets

METHOD AND SYSTEM FOR CONTROLLING TRANSPARENCY OF A DISPLAYING DEVICE

CROSS-REFERENCE TO RELATED APPLICATION

The present application claims benefit to Swedish patent application No. 1951484-3, filed Dec. 17, 2019, entitled "METHOD AND SYSTEM FOR CONTROLLING TRANSPARENCY OF A DISPLAYING DEVICE", and is hereby incorporated by reference in its entirety.

TECHNICAL FIELD

The present disclosure relates generally to methods, systems and devices for improved visibility of virtual objects, especially in augmented reality, AR, environments.

BACKGROUND ART

Augmented reality, AR, is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that fulfills three basic features: a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one.

Sometimes the virtual objects can be weaker than the real environment, especially in daylight or other bright situations. Also, virtual objects will appear semi-transparent if they are not rendered bright enough. And sometimes virtual objects can be too strong compared to the real objects, especially when the display has a dark glass or/and in dark conditions. This is obvious if you compare displaying devices such as head-mounted devices, HMD, with different shades of lenses. In an HMD with a dark lens, the virtual objects are more present than in an HMD with a bright or clear lens. And vice versa, the real environment is more visible in an HMD with a bright lens than in an HMD with a dark lens. Hence, with a darker lens, some of the visibility of the real world is lost, but the visibility in the virtual world is increased. It is typically desired that the lens is as clear as possible so the user can see the real world in all lighting conditions, but that will make the virtual elements faint in some conditions.

Consequently, there exists a need for improvement when it comes to displaying virtual and real objects in an AR environment.

SUMMARY OF INVENTION

It is an object of the invention to address at least some of the problems and issues outlined above. An object of embodiments of the invention is to provide a method and a device which improves the experience for a user with respect to visibility of virtual objects in relation to the real world in an augmented reality, AR, environment, displayed for instance by means of a head-mounted display (HMD). It may be possible to achieve these objects, and others, by using methods, devices and computer programs as defined in the attached independent claims.

According to a first aspect of the present disclosure, there is provided a method for controlling the transparency level of a transparent displaying device arranged to display one or more virtual objects, the method comprising the steps of: obtaining a gaze point of a user; obtaining a position of at least one virtual object displayed by the displaying device; determining whether the attention of the user is directed to the virtual object based on the obtained gaze point; and if so, adjusting a transparency of the displaying device.

By adjusting the transparency level of the displaying device depending on whether or not the user looks at the virtual object, it is possible to improve the visibility of the virtual object when desired, whilst retaining the visibility of the real world when the user looks at real objects.

In a preferred embodiment, the method further comprises the steps of: obtaining a gaze convergence distance of the user; and determining whether the attention of the user is directed to the virtual object based on the obtained gaze convergence distance; and if so, adjusting the transparency level of the displaying device. By using the gaze convergence distance for left and right eye, the transparency level of the displaying device will only be adjusted if the user focuses on the virtual object. In other words, the user can look at a real object that is placed behind the virtual object with full transparency of the displaying device, even if the real object is close to or even partly covered by a virtual object.

In a further preferred embodiment, the step of obtaining the gaze point and/or the gaze convergence distance of the user comprises acquiring gaze data for each of the eyes of the user by means of an eye tracker and calculating the gaze point and/or the gaze convergence distance based on the acquired gaze data. Preferably, the gaze convergence distance is a function of an interpupillary distance, IPD, of the user based on an acquired pupil position of the left eye and the right eye.

In an alternative embodiment, the step of adjusting the transparency level of the displaying device comprises adjusting the transparency level in dependence on a distance between the gaze point and/or gaze convergence distance and the virtual object. By adjusting the transparency level in dependence on the distance, i.e. how far away from the virtual object the user is looking, a smoother, gradual change of the transparency level is achieved which is less strenuous for the user than a stepped on/off adjustment.

In an advantageous embodiment, the displaying device comprises a separate or integrated transparency-control layer, wherein the virtual object is rendered between the transparency-control layer and the user. By using a transparency-control layer positioned behind the rendered virtual objects, there is achieved a simple way of adjusting the transparency level of the displaying device without affecting the virtual objects.

In an advantageous embodiment, the step of adjusting the transparency level of the displaying device comprises adjusting the brightness, opacity, color and/or contrast of the displaying device. By adjusting one or more parameters of the displaying device, it is possible to control the transparency level in a simple way.

In a further preferred embodiment, the step of adjusting the transparency level of the displaying device comprises adjusting the transparency level in dependence on one or more of: size of the virtual object; surface texture of the virtual object; color of the virtual object; geometry of the virtual object; surrounding environment; and dwelling time. Similarly to the previously mentioned embodiment, it is possible to vary the adjustment of the transparency level of the displaying device based on characteristics of the virtual object and/or surrounding environment such that the change experienced by the user is as pleasant as possible.

In an alternative embodiment, the step of adjusting the transparency level of the displaying device comprises adjusting the transparency level in an area surrounding the virtual object. By adjusting the transparency level only in the area closest to the virtual object, the visibility of the real world is retained to a greater degree.

In a second aspect of the present disclosure, there is provided a system for controlling the transparency level of a transparent displaying device arranged to display one or more virtual objects, the system comprising: processing circuitry; and a memory, said memory containing instructions executable by said processing circuitry, whereby the system is operative for: obtaining a gaze point of a user; obtaining a position of at least one virtual object displayed by the displaying device; determining whether the attention of the user is directed to the virtual object based on the obtained gaze point; and if so, adjusting a transparency level of the displaying device.

In a preferred embodiment, the system is further operative for: obtaining a gaze convergence distance of the user; and determining whether the attention of the user is directed to the virtual object based on the obtained gaze convergence distance; and if so, adjusting the transparency level of the displaying device.

In an advantageous embodiment, the system further comprises at least one eye tracker configured to acquire gaze data for both of the eyes of a user, wherein the system is operative for calculating the gaze point and/or the gaze convergence distance based on the acquired gaze data.

In a preferred embodiment, the system is further operative for performing the method according to the first aspect and the respective embodiments mentioned above.

In a third aspect of the present disclosure, there is provided a displaying device comprising a system according to the second aspect.

In a preferred embodiment, the displaying device comprises a separate or integrated transparency-control layer, wherein the virtual object is rendered between the transparency-control layer and the user.

In a further preferred embodiment, the displaying device is a head-mounted display, HMD, or a head-up display, HUD.

In a fourth aspect of the present disclosure, there is provided a computer program comprising computer readable code means to be run in a system for controlling the transparency level of a transparent displaying device arranged to display one or more virtual objects, which computer readable code means when run in the system causes the system to perform the following steps: obtaining a gaze point of a user; obtaining a position of at least one virtual object displayed by the displaying device; determining whether the attention of the user is directed to the virtual object based on the obtained gaze point; and if so, adjusting a transparency level of the displaying device.

In alternative embodiments, the computer readable code means when run in the system further causes the system to perform the method according to the first aspect.

In a fifth aspect of the present disclosure, there is provided a carrier containing the computer program according to the third aspect, wherein the carrier is one of an electronic signal, an optical signal, a radio signal or a computer readable storage medium.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DESCRIPTION OF EMBODIMENTS

Figure 1:
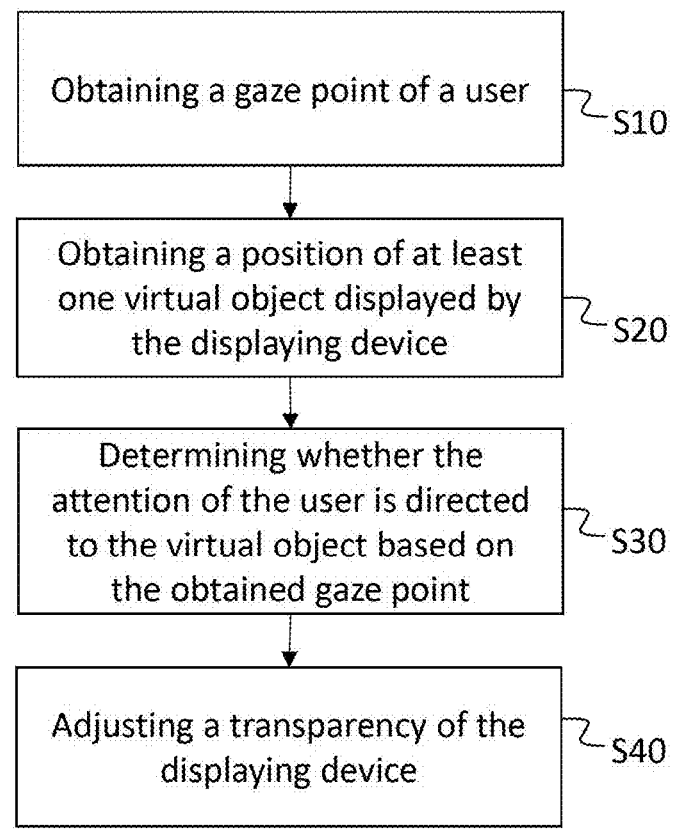
FIG. 1 shows a flowchart of a method according to one or more embodiments of the present disclosure.

In the following, a detailed description of a method and system according to the present disclosure is presented. In the drawing figures, like reference numerals designate identical or corresponding elements throughout the several figures. It will be appreciated that these figures are for illustration only and are not in any way restricting the scope of the invention Briefly described, a method controlling the transparency level of a transparent displaying device arranged to display one or more virtual objects is provided, which improves visibility of virtual objects in relation the real world to improve the AR experience of the user. By using methods, devices and computer programs according to the present disclosure, the AR experience for the user can be improved by adjusting the transparency level of the displaying device depending on whether the user is looking at a virtual or real object.

In the context of the present disclosure, it should be understood that a virtual object is any object which is rendered on a displaying device visible to a user; in other words, a virtual object does not have to be mapped in the real world. Hence, a text, digit or overlay rendered on the display could be a type of virtual object. In general, there are two types of virtual objects: augmented virtual objects; and user interface, UI, objects such as text, digits and overlays.

Referring now to FIG. 1, a flowchart of a method for controlling a transparency level of a transparent displaying device arranged to display one or more virtual objects according to one embodiment of the present disclosure is illustrated. The method may in some embodiments be performed by a system comprised in or comprising the displaying device, and in some embodiments, the method may be performed elsewhere using data obtained from an eye tracker and the displaying device, for example in a cloud environment to which the eye tracker and the displaying device is operatively connected.

The method comprises the step of obtaining S10 a gaze point of a user. As mentioned above, the eye data from which the gaze point is obtained may be acquired by an external eye tracker communicating with or operatively connected to the displaying device, or an eye tracker integrated with the system and/or displaying device.

The method further comprises the step of obtaining S20 a position of at least one virtual object displayed by the displaying device. Typically, the displaying device which renders and displays the virtual objects also possesses position information associated with the virtual objects.

The method further comprises the step of determining S30 whether the attention of the user is directed to the virtual object based on the obtained gaze point. If that is the case, the method further comprises the step of adjusting S40 a transparency level of the displaying device.

Figure 2A:
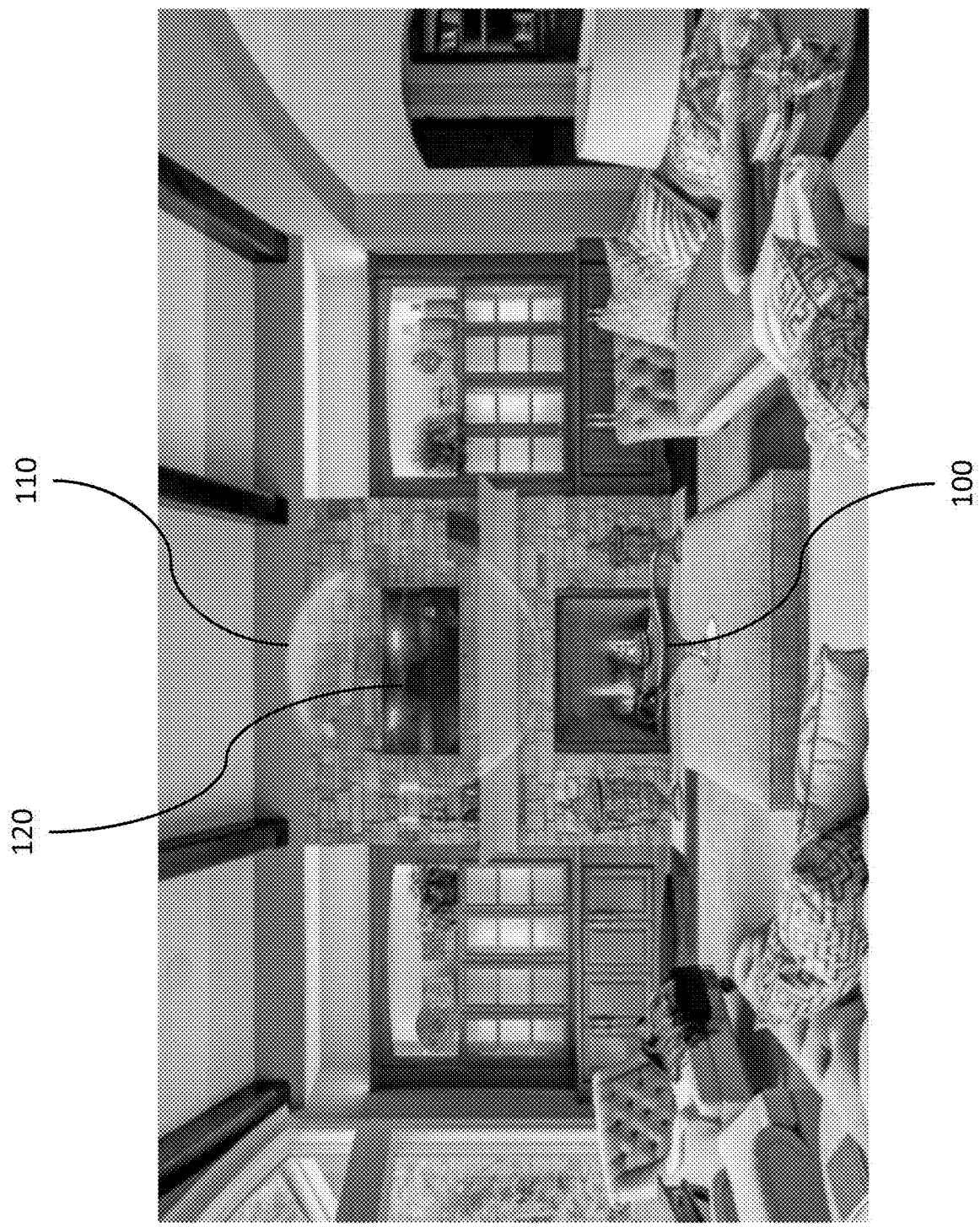
FIG. 2a shows a view through a transparent displaying device according to one or more embodiments of the present disclosure when a user is looking at an object in the real world.
Figure 2B:
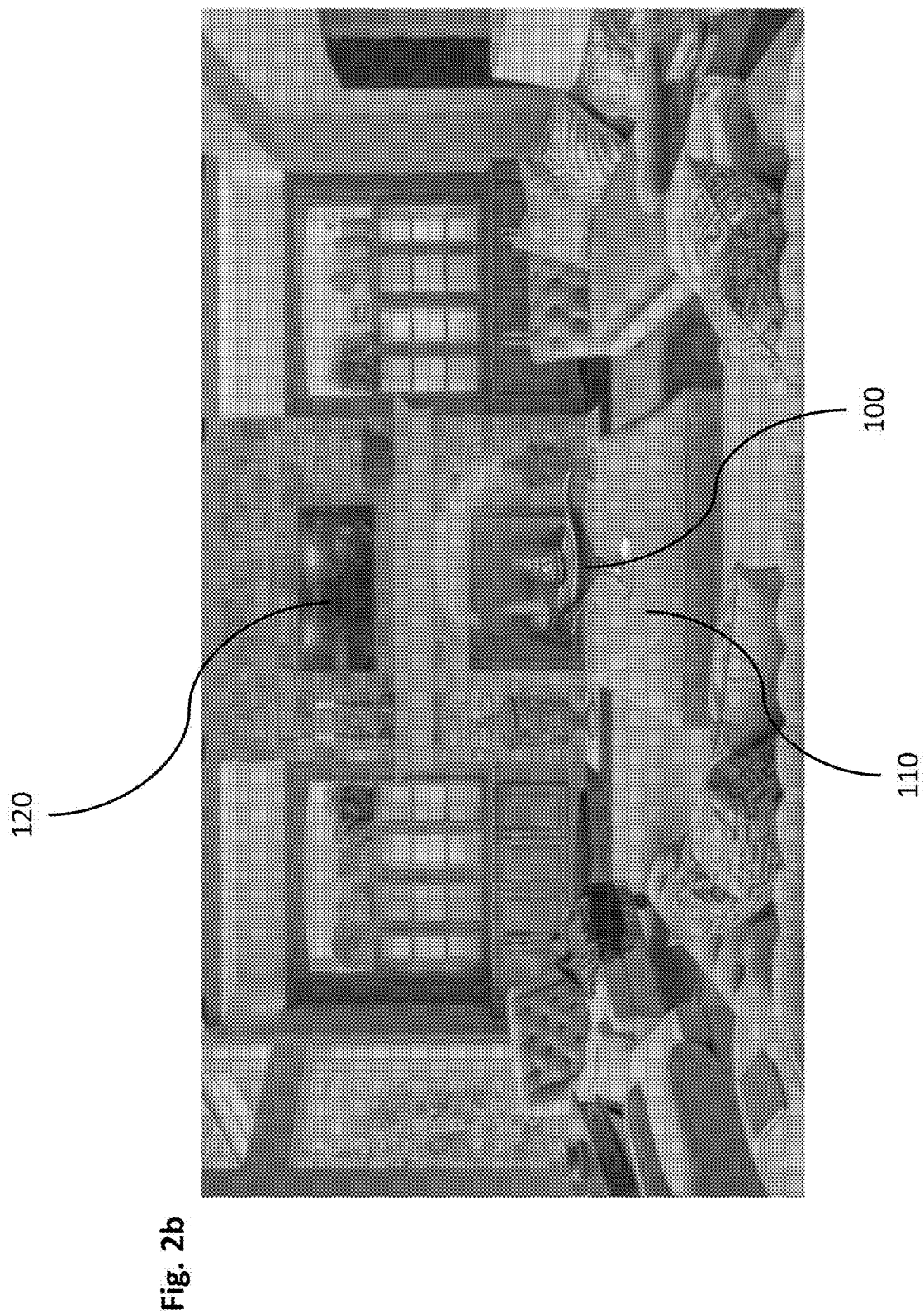
FIG. 2b shows view through a transparent displaying device according to one or more embodiments of the present disclosure when a user is looking at a virtual object.

Referring now to FIGS. 2a and 2b, the principle underlying the present invention will now be described. FIGS. 2a and 2b show a view as seen by a user looking at a real-world environment through a transparent displaying device 200, here depicted as a living room. The displaying device 200 is arranged to display one or more virtual objects 100, here in the form of an oil lamp, overlaid on the real-world environment to create an interactive augmented reality, AR, experience for the user. To visualize the gaze point of the user, a bubble or lens 110 is shown in FIGS. 2a and 2b merely for illustrative purposes.

In FIG. 2a, the attention of the user is directed to a real object 120, here in the form of a painting, as the bubble 110 is centered on the painting 120. The transparency level of the displaying device 200 is unadjusted in this case, i.e. the user sees the real-world-environment through the displaying device 200 essentially without modification compared to a person not looking through the displaying device 200. As may be seen in FIG. 2a, the lamp 100 appears weak and see-through compared to the background.

Referring now to FIG. 2b, the attention of the user is directed to a virtual object, e.g. the lamp 100, as the bubble 110 is centered on the lamp 100. As may be seen, the transparency level of the displaying device 200 has been adjusted such that the real-world environment appears darker, less vivid compared to FIG. 2a. Against this background, the lamp 100 appears clearer and stands out even though the rendering of the virtual object 100 is unchanged with respect to transparency.

Figure 3:
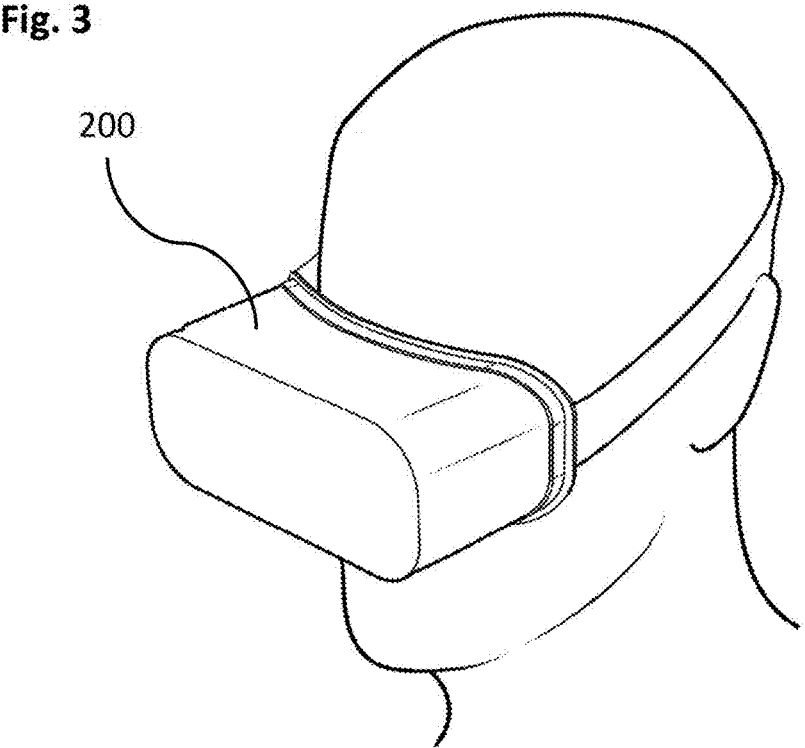
FIG. 3 shows a head-mounted displaying device, HMD, according to one or more embodiments of the present disclosure.

FIG. 3 shows a displaying device 200 according to one or more embodiments of the present disclosure. The displaying device 200, is a device which may optionally be adapted to be mounted (or arranged) at the head of a user, as shown in FIG. 3. The displaying device 200 may e.g. comprise and/or be comprised in a head-mounted display, HMD, such as an AR headset or an MR headset. Alternatively, the displaying device 200 may be a head-up display, HUD (not shown), e.g. in a vehicle or other situations where transparent displaying devices are suitable.

The displaying device 200 is typically further configured to provide eye tracker functionality by a gaze tracking signal using one or more gaze tracking sensors, e.g. indicative of a gaze point and/or a convergence distance. In other words, the displaying device 200 is configured to provide an indication of a direction the user is looking in and/or a depth at which the user is looking/watching. Preferably, the displaying device 200 comprises one eye tracker for each eye.

The eye tracker makes the displaying device 200 aware of where the user is looking. The displaying device 200 is responsible for rendering the virtual environment, so it knows which virtual object 100 the user is looking directly or close at. Or if the user is not looking at any virtual object at all. When the displaying device 200 recognizes that the user is looking at a certain virtual object 100 (or is about to look at it, by using prediction), by using eye tracker and software to map virtual objects 100 to gaze points, it will adjust the transparency level to make the virtual object become brighter compared to the real environment and to make less light go through it to avoid transparency-effect. When the user is looking away from virtual object 100, the transparency level will revert to the unadjusted state such that the real-world environment is visible with full transparency.

In one embodiment, the method further comprises obtaining the gaze convergence distance of the user, i.e. the depth at which the user is focusing. By using the convergence distance for the left and right eye, the transparency level of the displaying device 200 will only be adjusted if the convergence distance matches with the virtual object 100. So the user can look at a real object 120 that is placed behind the virtual object 100 (like the painting in FIGS. 2a and 2b) with full transparency even if it is close or partly covered by a virtual object 100 (like the lamp in FIGS. 2a and 2b).

Figure 4:
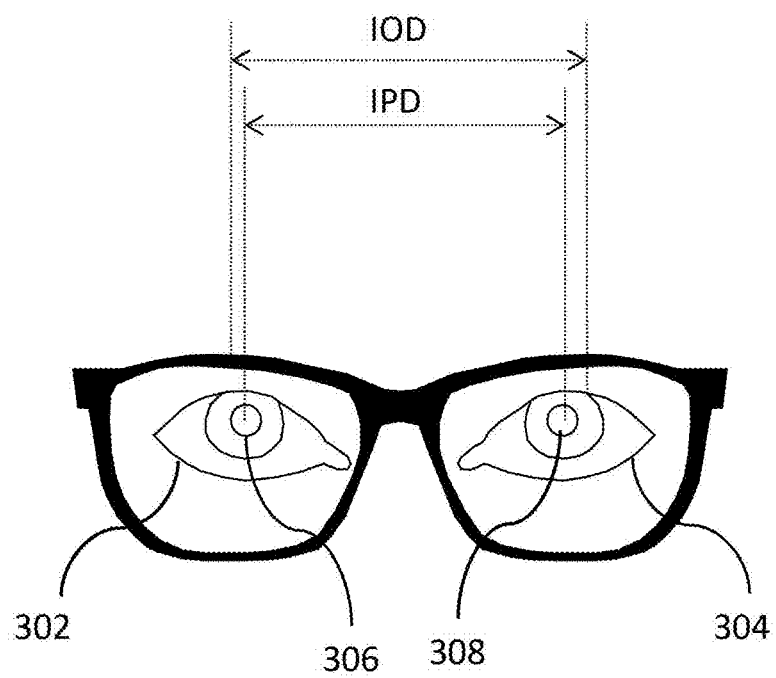
FIG. 4 illustrates an interocular distance, IOD, and interpupillary distance, IPD, of a user.

The convergence distance may be calculated for instance by using an interocular distance, IOD, indicating a distance between the eyes 302, 304 of the user, and an interpupillary distance, IPD, indicating a distance between the pupils 306, 308 of the user, and a predetermined function describing a relationship between the IOD and the IPD. The IOD and IPD of a user are illustrated in FIG. 4. Generally, the IOD remains constant as it is given by the anatomy of the user, the distance between the eye ball center of each eye 302, 304 of the user. The IPD on the other hand changes as the user looks at objects located near or far away and may be obtained from gaze data acquired e.g. by means of an eye tracker.

The transparency level may additionally be controlled by the distance (physical) between the gaze point and/or convergence distance and the virtual object 100. At a large distance the transparency level is higher than if the user looks close to the virtual object 100. In this way, it is possible to achieve a smoother, more pleasant adjustment as the transparency level is gradually adjusted instead of suddenly switched from a high to a low transparency level.

According to one embodiment, the displaying device 200 is a head-mounted display (HMD) and the virtual object 100 is projected at a predetermined distance defined by the HMD. The HMD is a transparent display configured for augmented and/or mixed reality (AR/MR).

The displaying device 200 may comprise a 3D display, which is able to visualize a plurality of virtual objects 100 in response to a control signal received from a computer. The 3D display may for example be a stereoscopic display. The 3D display may for example be comprised in glasses equipped with AR functionality. Further, the 3D display may be a volumetric 3D display, being either autostereoscopic or automultiscopic, which may indicate that they create 3D imagery visible to an unaided eye, without requiring stereo goggles or stereo head-mounted displays. Consequently, the 3D display may be part of the displaying device 200. However, the 3D display may also be a remote display, which does not require stereo goggles or stereo head-mounted displays. In a third example, the 3D display is a remote display, where stereoscopic glasses are needed to visualize the 3D effect to the user.

The adjustment of the transparency level of the displaying device 200 may be achieved by means of transparency-control layer, which may be a separate layer or display, or integrated with the displaying device 200. As one example, the transparency-control layer comprises a liquid-crystal display, LCD, which may be dimmed from a bright state to a dark state. The transparency-control layer is positioned behind, i.e. further away from the user than, a layer which renders the virtual objects 100 such that the virtual objects 100 are not affected by the adjustment of the transparency level.

In one embodiment, the adjustment of the transparency level is achieved by adjusting one or more of the brightness, opacity, color and contrast of the displaying device 200.

In one embodiment, the transparency level of the displaying device 200 may be adjusted in dependence on the size, surface texture, color, geometry and/or the surrounding environment of the virtual object 100 to create a better experience. For instance, if the virtual object 100 is small, the adjustment of the transparency level will not be as strong as for a larger virtual object 100 to create a non-intrusive experience. Or if the surrounding environment is dark, the adjustment of the transparency level will not be as strong as for a bright environment or background. Additionally, the transparency level may also be controlled based on dwelling time, so if a user looks longer at an object, the transparency level will be lower. A suitable interval for the dwelling time may be around 0-1 second before the transparency level is further adjusted to a lower level.

In one embodiment, it is foreseen to partly adjust the transparency level of the displaying device 200, only in the surroundings of the virtual object 100. Such a partial adjustment may be preferable as it would minimize the periphery darkness that could be visible to the user.

Figure 5:
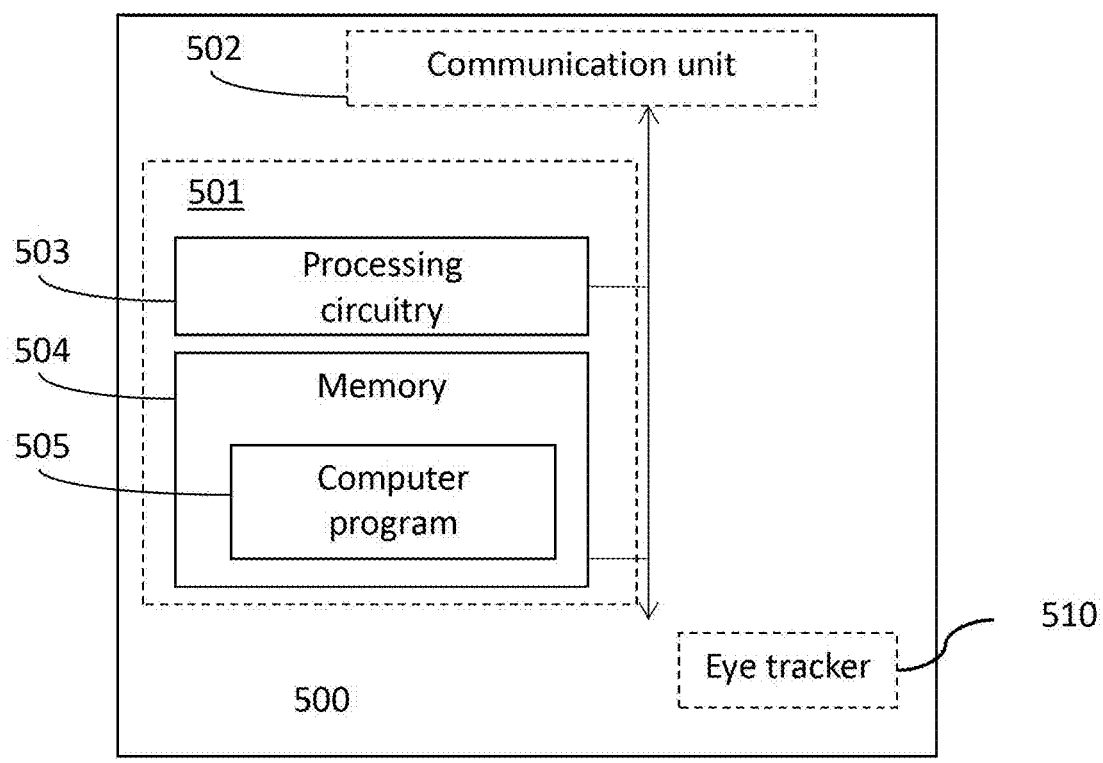
FIG. 5 shows a schematic overview of a system for controlling the transparency level of a transparent displaying device arranged to display one or more virtual objects.

FIG. 5, shows a system 500, capable of displaying a virtual object 100 and enabling the user to interact with the virtual object 100. The system 500, which may be incorporated in a displaying device 200 arranged to display one or more virtual objects 100, comprises processing circuitry 503, and a memory 504. The processing circuitry 503 may comprise one or more programmable processors, application-specific integrated circuits, field programmable gate arrays or combinations of these (not shown) adapted to execute instructions. The memory 504 contains instructions executable by said processing circuitry, whereby the system 500 is operative for obtaining a gaze point of a user, the gaze point lying in a field of view defined by the displaying device 200, and obtaining a position of at least one virtual object 100 displayed by the displaying device 200. The system 500 is further operative for determining whether the attention of the user is directed to the virtual object 100 based on the obtained gaze point, i.e. whether the gaze point coincides with the virtual object 100, and if so, the system 500 is further operative for adjusting a transparency level of the displaying device 200.

In one embodiment, the system 500 is further operative for obtaining a gaze convergence distance of the user; and determining whether the attention of the user is directed to the virtual object 100 based on the obtained gaze convergence distance; and if so, adjusting the transparency level of the displaying device 200.

According to one embodiment, the system 500 further comprises an eye tracker 510 configured to acquire gaze data for each of the eyes of a user, wherein the system 500 is further operative for calculating the gaze point and/or the gaze convergence distance based on the acquired gaze data. Preferably, the gaze convergence distance is a function of an interpupillary distance, IPD, of the user based on an acquired pupil position of the right eye 304 and the left eye 302.

In one embodiment, the system 500 is further operative for adjusting the transparency level in dependence on a distance between the gaze point and/or gaze convergence distance and the virtual object 100.

In one embodiment, the displaying device 200 comprises a separate or integrated transparency-control layer, wherein the virtual object 100 is rendered between the transparency-control layer and the user.

In one embodiment, the system 500 is further operative for adjusting the brightness, opacity, color and/or contrast of the displaying device 200.

In one embodiment, the system 500 is further operative for adjusting the transparency level in dependence on one or more of: size, surface texture, color and geometry of the virtual object 100; the surrounding real-world environment; and the dwelling time while looking at the virtual object 100.

In one embodiment, the system 500 is further operative for adjusting the transparency level in an area surrounding the virtual object 100.

In some embodiments, the feature(s) of the system 500, e.g. the processing circuitry 503 and the memory 504, which perform the method steps may be a group of network nodes, wherein functionality for performing the method are spread out over different physical, or virtual, nodes of the network. In other words, the feature(s) of the system 500 which perform the method steps may be a cloud-solution, i.e. the feature(s) of the system 500 which perform the method steps may be deployed as cloud computing resources that may be distributed in the network.

According to other embodiments, the system 500 may further comprise a communication unit 502, which may be considered to comprise conventional means for communicating with relevant entities, such as other computers or devices to which it is operatively connected. The instructions executable by said processing circuitry 503 may be arranged as a computer program 505 stored e.g. in the memory 504. The processing circuitry 503 and the memory 504 may be arranged in a sub-arrangement 501. The sub-arrangement 501 may be a microprocessor and adequate software and storage therefor, a Programmable Logic Device, PLD, or other electronic component(s)/processing circuit(s) configured to perform the methods mentioned above.

The computer program 505 may comprise computer readable code means, which when run in an system 500 causes the system 500 to perform the steps described in any of the described embodiments of the system 500. The computer program 505 may be carried by a computer program product connectable to the processing circuitry 503. The computer program product may be the memory 504. The memory 504 may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory 504. Alternatively, the computer program may be stored on a server or any other entity connected to the system 500, to which the system 500 has access via the communication unit 502. The computer program may then be downloaded from the server into the memory 504.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for controlling a transparency level of a displaying device configured to display one or more virtual objects, the method comprising the steps of:
    obtaining a gaze point of a user;
    obtaining a position of at least one virtual object displayed by the displaying device;
    determining whether an attention of the user is directed to a virtual object of the at least one virtual object based on the obtained gaze point; and
    in response to determining that the attention of the user is directed to the virtual object based on the obtained gaze point, adjusting a first transparency level of an area surrounding the virtual object to which the attention of the user is directed, wherein a second transparency level associated with the virtual object is maintained as the virtual object and the surrounding area are displayed by the displaying device.

2. The method according to claim 1, further comprising the steps of:
    obtaining a gaze convergence distance of the user;
    determining whether the attention of the user is directed to the virtual object based on the obtained gaze convergence distance; and
    in response to determining that the attention of the user is directed to the virtual object based on the obtained gaze convergence distance, further adjusting the first transparency level of the surrounding area.

3. The method according to claim 2, wherein the step of obtaining the gaze point and/or the gaze convergence distance of the user comprises using an eye tracker to acquire gaze data for each of eyes of the user and calculating the gaze point and/or the gaze convergence distance based on the acquired gaze data.

4. The method according to claim 3, wherein the gaze convergence distance is a function of an interpupillary distance, IPD, of the user based on an acquired pupil position of a left eye and a right eye of the user.

5. The method according to claim 1, wherein the step of adjusting first the transparency level comprises adjusting the first transparency level in dependence on a distance between the gaze point and/or a gaze convergence distance and the virtual object.

6. The method according to claim 1, wherein the displaying device comprises a separate or integrated transparency-control layer, wherein the virtual object is rendered between the transparency-control layer and the user.

7. The method according to claim 1, wherein the step of adjusting the first transparency level comprises adjusting brightness, opacity, color and/or contrast of the displaying device.

8. The method according to claim 1, wherein the step of adjusting the first transparency level comprises adjusting the first transparency level in dependence on one or more of:
    size of the virtual object;
    surface texture of the virtual object;
    color of the virtual object;
    geometry of the virtual object;
    surrounding environment; and
    dwelling time.

9. The method according to claim 1, wherein adjusting the first transparency level of the area surrounding the virtual object includes:
    determining a size of the virtual object; and
    determining, based on the size of the virtual object, an extent of the adjustment of the first transparency level of the area surrounding the virtual object.

10. A system for controlling a transparency level of a displaying device configured to display one or more virtual objects the system comprising:
    processing circuitry; and
    a memory, said memory containing instructions executable by said processing circuitry, whereby the system is operative for:
        obtaining a gaze point of a user;
        obtaining a position of at least one virtual object displayed by the displaying device;
        determining whether an attention of the user is directed to a virtual object of the at least one virtual object based on the obtained gaze point; and
        in response to determining that the attention of the user is directed to the virtual object based on the obtained gaze point, adjusting a first transparency level of an area surrounding the virtual object to which the attention of the user is directed, wherein a second transparency level associated with the virtual object is maintained as the virtual object and the surrounding area are displayed by the displaying device.

11. The system according to claim 10, wherein the system is further operative for:
    obtaining a gaze convergence distance of the user;
    determining whether an attention of the user is directed to the virtual object based on the obtained gaze convergence distance; and
    in response to determining that the attention of the user is directed to the virtual object based on the obtained gaze convergence distance, further adjusting the first transparency level of the surrounding area.

12. The system according to claim 11, further comprising:
    at least one eye tracker configured to acquire gaze data for eyes of a user,
    wherein the system is operative for calculating the gaze point and/or the gaze convergence distance based on the acquired gaze data.

13. A displaying device having a system for controlling a transparency level, the displaying device comprising:
    a transparent displaying device arranged to display one or more virtual objects;
    processing circuitry; and
    a memory, said memory containing instructions executable by said processing circuitry, whereby the system is operative for:
        obtaining a gaze point of a user;
        obtaining a position of at least one virtual object displayed by the displaying device;
        determining whether an attention of the user is directed to a virtual object of the at least one virtual object based on the obtained gaze point; and in response to determining that the attention of the user is directed to the virtual object based on the obtained gaze point, adjusting a first transparency level of an area surrounding the virtual object to which the attention of the user is directed, wherein a second transparency level associated with the virtual object is maintained as the virtual object and the surrounding area are displayed by the displaying device.

14. The displaying device according to claim 13, wherein the displaying device comprises a separate or integrated transparency-control layer, wherein the virtual object is rendered between the transparency-control layer and the user.

15. The displaying device according to claim 13, wherein the displaying device is a head-mounted display, HMD, or a head-up display, HUD.

16. A non-transitory computer-readable storage medium storing thereon a computer program comprising computer readable code means to be run in a system for controlling a transparency level of a displaying device configured to display one or more virtual objects, which computer readable code means when run in the system causes the system to perform operations comprising:

obtaining a gaze point of a user;

obtaining a position of at least one virtual object displayed by the displaying device;

determining whether an attention of the user is directed to a virtual object of the at least one virtual object based on the obtained gaze point; and in response to determining that the attention of the user is directed to the virtual object based on the obtained gaze point, adjusting a first transparency level of an area surrounding the virtual object to which the attention of the user is directed, wherein a second transparency level associated with the virtual object is maintained as the virtual object and the surrounding area are displayed by the displaying device.

* * * * *